(12) United States Patent
Duanmu et al.

(10) Patent No.: US 12,167,528 B2
(45) Date of Patent: Dec. 10, 2024

(54) SEGMENTED LINER AND METHODS OF USE WITHIN A MICROWAVE PLASMA APPARATUS

(71) Applicant: 6K Inc., North Andover, MA (US)

(72) Inventors: Ning Duanmu, Nashua, NH (US); Michael Kozlowski, Reading, MA (US); Scott Turchetti, Sudbury, MA (US); Kamal Hadidi, Sudbury, MA (US)

(73) Assignee: 6K Inc., North Andover, MA (US)

( * ) Notice: Subject to any disclaimer, the term of this patent is extended or adjusted under 35 U.S.C. 154(b) by 805 days.

(21) Appl. No.: 16/829,269

(22) Filed: Mar. 25, 2020

(65) Prior Publication Data

US 2020/0314991 A1   Oct. 1, 2020

Related U.S. Application Data

(60) Provisional application No. 62/823,698, filed on Mar. 26, 2019.

(51) Int. Cl.
*H05H 1/30* (2006.01)
*B23K 10/00* (2006.01)
*B23K 37/00* (2006.01)

(52) U.S. Cl.
CPC ............. *H05H 1/30* (2013.01); *B23K 10/00* (2013.01); *B23K 37/003* (2013.01)

(58) Field of Classification Search
CPC ......... H05H 1/30; C23C 16/511; C23C 4/134; C23C 16/513; B23K 10/00; B23K 37/003; H01J 37/32458; H01J 37/32477; H01J 37/32495

USPC ...................................................... 219/121.48
See application file for complete search history.

(56) References Cited

U.S. PATENT DOCUMENTS

| | | | |
|---|---|---|---|
| 2,422,009 A | 6/1947 | Goetze | |
| 4,795,879 A | 1/1989 | Hull et al. | |
| 5,332,200 A * | 7/1994 | Gorin | F27B 14/061 266/286 |
| 5,671,045 A | 9/1997 | Woskov et al. | |
| 5,828,029 A * | 10/1998 | Loubet | H05H 1/34 219/121.36 |
| 5,902,404 A | 5/1999 | Fong et al. | |
| 9,238,211 B1 | 1/2016 | Osborne et al. | |
| 9,254,470 B1 | 2/2016 | Spangler | |

(Continued)

FOREIGN PATENT DOCUMENTS

| | | |
|---|---|---|
| JP | S613656 A | 1/1986 |
| JP | H11135485 A | 5/1999 |

(Continued)

OTHER PUBLICATIONS

International Search Report and Written Opinion issued in PCT Application No. PCT/IB2020/052824 dated Aug. 2, 2020.

*Primary Examiner* — Janie M Loeppke
*Assistant Examiner* — Simpson A Chen
(74) *Attorney, Agent, or Firm* — WOMBLE BOND DICKINSON (US) LLP; Deborah M. Vernon

(57) ABSTRACT

Disclosed herein are devices, systems and methods of use of an improved liner for a plasma torch. In particular, a segmented liner for use in a plasma torch (e.g., annular torch, swirl torch) is provided. In general, the improved segmented liner has improved thermal shock resistance capabilities over conventional unitary liners.

9 Claims, 8 Drawing Sheets

(56) References Cited

U.S. PATENT DOCUMENTS

| | | | |
|---|---|---|---|
| 2008/0127893 A1* | 6/2008 | Tomasel | H01J 37/32357 |
| | | | 118/723 E |
| 2008/0173641 A1* | 7/2008 | Hadidi | C23C 4/134 |
| | | | 219/121.36 |
| 2013/0114945 A1 | 5/2013 | Pionetti et al. | |
| 2013/0126331 A1 | 5/2013 | Kudela et al. | |
| 2013/0146225 A1 | 6/2013 | Chen et al. | |
| 2016/0381777 A1 | 12/2016 | Boulos et al. | |

FOREIGN PATENT DOCUMENTS

| | | | |
|---|---|---|---|
| WO | 2004107413 | A2 | 12/2004 |
| WO | 2004107414 | A2 | 12/2004 |

\* cited by examiner

SEGMENTED LINER AND METHODS OF USE WITHIN A MICROWAVE PLASMA APPARATUS

RELATED APPLICATIONS

This application claims priority to U.S. Provisional Patent Application 62/823,698 filed on Mar. 26, 2019 titled "SEGMENTED LINER AND METHODS OF USE WITHIN A MICROWAVE PLASMA APPARATUS," the contents of which are hereby incorporated by reference in their entirety.

FIELD OF THE INVENTION

The present technology generally relates to devices, systems, and methods for providing an improved ceramic liner for use within a microwave plasma reactor. In particular, the present technology relates to a segmented ceramic liner. The segmented ceramic liner can be less expensive to manufacture, and in addition can be tailored to provide improved thermal shock resistance, which can minimize cracking or other failure of the liner.

BACKGROUND

A liner is an important part of both core-annular and swirl plasma torch design. Annular plasma torches are typically constructed to include three concentrically mounted ceramic tubes: an inner tube, a middle tube, and the ceramic liner. The swirl plasma torch typically includes a swirl chamber and a ceramic liner. In general, the ceramic liner and tubes are made of quartz or other high temperature ceramic material such as, for example, alumina or silicon nitride. These high temperature ceramics are selected to allow high temperature operation of the plasma environment and to provide microwave energy transparency. In addition, it is desired that the high temperature ceramics have good thermal shock resistance to minimize cracking or failure. In general, the liner aids in the transport and delivery of sample materials (e.g., precursors, such as liquid droplets or powders, etc.) to the plasma.

The primary failure mode of the liner is cracking due to high temperature gradients under normal operating conditions. This is due in part to inadequate thermal shock resistance of the ceramic materials. Typically, high purity ceramic materials have a lower than desired thermal shock resistance. As a result, cracking has been known to occur at locations that are exposed to large thermal gradients (e.g., bottom of the liner which may be located outside of the bottom portion of the plasma, whereas other portions of the liner experience the full thermal force of the plasma). Failure of the liner results in costly repairs and replacement of the entire liner as well as lost operation time of the plasma torch.

SUMMARY

Provided herein are devices and methods for providing an improved ceramic liner for a plasma torch. In particular, this disclosure relates to a segmented liner that is tailored to have improved thermal shock resistance as compared to conventional ceramic liners. In general, the improved thermal shock resistance is achieved by providing a segmented liner (e.g., multiple vertically stacked ceramic segments) that are tailored (e.g., designed or adapted shape, size, and/or materials) to provide improved thermal shock resistance. For example, in one embodiment, the joints between the adjacent vertically stacked ceramic segments forming the improved liner are located where a temperature gradient is the greatest for a particular set of plasma operating conditions (e.g., size and location of the plasma within the reactor). In certain embodiments, the joints can be formed of or coated with a material that has improved thermal shock resistance. In some embodiments, the joints can be shaped to provide enhanced thermal shock resistance. In general, the segmented nature of the liner allows great flexibility in material choice, and manufacturability. In particular, by segmenting the liner, a length of the liner is minimized, which significantly improves manufacturability (e.g., easier to manufacture, more manufacturing options, less waste.) Also by segmenting the liner, replacement opportunities become available. That is, if a portion or a segment of the liner becomes damaged or contaminated, that portion can be removed and replaced, thereby increasing the overall life of the ceramic liner.

In general, the liners and methods of using the liners disclosed herein relate to the processing of materials (e.g., liquids, powders, etc.) within a microwave plasma torch (e.g., a core-annular plasma torch, a swirl plasma torch). The segmented liners of the present technology include joints between adjacent vertically stacked segments. These joints are tailored to provide improved performance. In embodiments, the clearance or spacing between two adjacent segments forming the joint are highly controlled (e.g., tight tolerances, very closely spaced) to minimize plasma leakage and arcing. In general, the segmented liner is supported and surrounded by an outer tube (e.g., an outer quartz tube) that provides additional dielectric resistance in high density electrical fields, such as those found in and around the environments of a microwave plasma plume.

One aspect of the present technology is directed to a liner system for a plasma torch, such as, for example a core-annular plasma torch or a swirl plasma torch. The liner system includes: a segmented casing comprising two or more segments (e.g., 2, 3, 4, or more) vertically stacked such that a joint is formed between a top portion of a lower casing segment and a bottom portion of a vertically adjacent casing segment; an outer tube sized and positioned such that the segmented casing is disposed within the interior of the outer tube; and an alignment member for positioning and maintaining the position of the segmented casing with respect to the outer tube. The outer tube and each of the two or more casing segments are each formed from a material transparent to microwave energy, and each joint within the segmented casing is configured to minimize plasma leakage. In some embodiments, the segmented casing can be in the form of a segmented tube, a cylindrical pipe or conduit, or a conduit or channel having any appropriate cross-sectional geometry.

This aspect of the technology can include one or more of the following features. In some embodiments, the segmented liner can be a ceramic liner. In embodiments having a two-piece segmented ceramic liner, the segmented ceramic casing include a first casing segment and a second casing segment with a first joint disposed between the first casing segment and the second casing segment. In an embodiment including a three-piece liner, the segmented ceramic casing includes a bottom casing segment, a middle casing segment, and a top casing segment with a first joint disposed between the bottom casing segment and the middle casing segment and a second joint disposed between the middle casing segment and the top casing segment. In certain embodiments, the segmented ceramic casing includes or is formed of four casing segments. In some embodiments, more than 4 casing segments may be desired (e.g., 5 or even 6 or 7). In some embodiments, the alignment member of the liner system includes a lip or a trench disposed in the outer casing. In certain embodiments, the alignment member comprises a first surface disposed on the outer casing and a second surface disposed on the segmented ceramic casing. In these embodiments, the first surface includes a mating element that connects to the second surface. In addition, the alignment member can include a water cooled flange connectable to the outer tube. In some embodiments the water cooled flange is also connectable to a top ceramic casing segment. The outer tube, in one or more embodiments, is formed of a dielectric resistant material. In some embodiments the outer tube is formed of quartz. In certain embodiments, the joint formed between the two or more segments is a lap joint. In other embodiments, the joint formed is a tapered joint.

Another aspect of the present technology is directed to a liner system for a plasma torch (e.g., a core-annular plasma torch, a swirl plasma torch). This system includes three segments forming the segmented liner. That is, the liner system includes: a top ceramic casing segment, a middle ceramic casing segment, a bottom ceramic casing segment, an outer tube, and an alignment member for positioning the top ceramic casing segment with respect to the outer tube. The outer tube is sized and positioned such that the top ceramic casing segment, the middle ceramic casing segment, and the bottom ceramic casing segment fit within interior space of the outer tube. The outer tube is formed from a material transparent to microwave energy (e.g., quartz). The middle ceramic casing segment is sized and positioned to vertically extend from a top portion of the bottom ceramic casing segment at a first joint; and the top ceramic casing segment is sized and positioned to vertically extend from a top portion of the middle ceramic casing segment at a second joint. The first joint includes the top portion of the bottom ceramic casing segment and a bottom portion of the middle ceramic casing segment, and the second joint including the top portion of the middle ceramic casing segment and the bottom portion of the top ceramic casing segment. Both the first and second joints are sized to minimize plasma leakage; wherein each of the top ceramic casing segment, the middle ceramic casing segment, and the bottom ceramic casing segment are formed of a ceramic material that is transparent to microwave energy.

This aspect of the technology can include one or more of the following features. In certain embodiments, the first and/or second joint comprises a lap joint. In some embodiments, the first and/or second joint comprises a tapered joint. In certain embodiments, the top and bottom ceramic casing segments are formed of substantially the same ceramic material (e.g., both formed of alumina). In some embodiments, the middle ceramic casing segment is also formed of the substantially the same ceramic material (e.g., top, middle, and bottom casing segments are all formed of alumina). In certain embodiments, the top ceramic casing segment is formed of a different ceramic than the middle ceramic casing segment and the bottom ceramic casing segment. For example, the top ceramic casing segment can be formed of or include quartz and the middle and bottom casing segments can be formed of or include alumina. In certain embodiments, the top portion of the bottom ceramic casing segment and the bottom portion of the middle ceramic casing segment are formed of or include a different ceramic material than remaining portions of the bottom ceramic casing segment and middle ceramic casing segment. That is, the first joint, which includes the top portion of the bottom ceramic casing segment and the bottom portion of the middle ceramic casing segment, is formed of a different material than the remaining portions (portions which do not form the first joint) of the bottom and middle casing segments. For example, the top portion of the bottom ceramic casing segment and the bottom portion of the middle ceramic casing segment are formed of or include a coating of boron nitride, whereas the remaining portions of the bottom and middle ceramic casing segments can be formed of alumina. In certain embodiments, the alignment member includes a lip or a trench disposed in the outer tube. In some embodiments, the alignment member comprises a first surface disposed on the outer tube and a second surface disposed on the top ceramic casing segment. The first surface includes a mating element which connects to the second surface. In certain embodiments, the alignment member includes a water cooled flange that is connectable to the outer tube (and in some cases, also to the top ceramic casing segment). The water cooled flange, in some embodiments, positions and substantially maintains the position of the top ceramic casing segment with respect to the outer tube to create an annular gap between (i) an inner surface of the outer tube and (ii) an outer perimeter surface formed from vertical stacking of the bottom ceramic casing segments, the middle ceramic casing segment, and the top ceramic casing segment. In certain embodiments including the annular gap, a system for supplying a cooling gas is provided such that a cooling gas can be supplied to or introduced into the annular gap. In some embodiments, the outer tube of the liner system is formed of or includes quartz. The outer tube can be sized for use with a core-annular plasma torch. In other embodiment, the outer tube is sized for use with a swirl plasma torch. Any of the embodiments can include tailored sizing of the lengths of the top, middle and bottom ceramic segments. For example, in some embodiments, the top ceramic casing segment and the middle ceramic casing segment are sized such that the second joint is positioned at a location of an extreme thermal gradient caused by a plasma generated by the plasma torch. In certain embodiments the bottom ceramic casing segment and the middle ceramic casing segment are sized such that the first joint is positioned at an additional location corresponding to an extreme thermal gradient caused by the plasma generated by the plasma torch.

Another aspect of the present technology is directed to a method of assembling a liner system for a plasma torch (e.g., a core-annular plasma torch, a swirl plasma torch). The method includes: forming a segmented liner by vertically stacking at least two ceramic segments, each of at least two ceramic segments including at least one connection end for forming a joint between two adjacent vertically stacked ceramic segments; positioning an outer tube to surround the segmented liner; and securing and aligning the segmented liner to the outer tube with an alignment member. Each of the at least two ceramic segments are formed of ceramic material transparent to microwave energy. Some embodiments can further include flowing a cooling gas between the secured and aligned segmented liner and outer tube.

A further aspect of the present technology is directed to a method of assembling a liner system for a plasma torch. The method includes: forming a segmented liner by vertically stacking a bottom ceramic casing segment, a middle ceramic casing segment, and a top ceramic casing segment, thereby creating a top joint between the top and middle ceramic casing segments and a bottom joint between the middle and bottom casing segments; positioning an outer tube to surround the segmented liner, the outer tube being transparent to microwave energy (e.g., a quartz outer tube); and securing and aligning the segmented liner to the outer tube with an alignment member, wherein each of the top, middle, and bottom ceramic casing segments are formed of ceramic material transparent to microwave energy.

Another aspect of the present technology is directed to a method of maintaining a liner system for a plasma torch. The method includes: detecting a cracked or a worn segment within a vertically stacked segmented ceramic liner; disconnecting an outer microwave transparent tube from the vertically stacked segmented ceramic liner; replacing the worn segment with a new ceramic segment to form a new vertically stacked segmented ceramic liner; positioning the outer microwave transparent tube to surround the new vertically stacked segmented ceramic liner; securing and aligning the new vertically stacked segmented ceramic liner to the outer microwave transparent tube with an alignment member; wherein the new vertically stacked segmented ceramic liner is formed of ceramic material transparent to microwave energy.

Another aspect of the present technology is directed to a liner for a plasma torch including a casing for use with a plasma within the plasma torch. The casing is produced from at least one material that is transparent to microwave energy and is designed, formed and installed in the plasma torch to enable a desired portion of the casing to encase the plasma and span a predetermined distance with respect to the plasma in the plasma torch so that different portions of the casing are exposed to different temperature gradients of the plasma. The material, design and installation of the casing, enables different portions of the casing to expand and contract with respect to each other to enhance thermal shock resistance and improve wear capabilities of the casing. Improved wear capabilities can include, at least, reducing if not preventing cracking of the casing under typical plasma torch operations and minimizing if not eliminating plasma leakage through the casing. This aspect of the technology can include one or more of the following features. In some embodiments, the casing is made from a ceramic material. In some embodiments, the casing is made in the form of a fabric. In some embodiments, the casing is made in the form of a non-woven fabric. In some embodiments, the liner also includes a first support engaging with a first end of the casing and a second support engaging with a second end of the casing, wherein the first support and the second support are configured to engage with a portion of the plasma torch to secure the casing with respect to the plasma. In some embodiments, the casing is made from at least two segments with a friction joint between the two segments.

Another aspect of the present technology is directed to a liner for a plasma torch including a segmented casing for use within a plasma torch. The segmented casing includes at least two segments formed from materials that are transparent to microwave energy and are formed and aligned to enable a substantially self-sealing friction joint to be formed between the segments. The joint enables the segments to expand and contract with respect to each other while minimizing plasma leakage and arcing between the segments. The segmented casing is positioned with respect to the plasma to expose different portions of the segments to different temperature gradients of the plasma, and thereby expand and contract with respect to each other to enhance thermal shock resistance and improve wear capabilities, including at least reducing or preventing cracking of the segments during operation of the plasma torch. This aspect of the technology can include one or more of the following features. In some embodiments, a number, size, or length of the segments are tailored to provide enhanced thermal shock resistance or improved wear capabilities to the segmented casing. In some embodiments, the joint is made of or coated with materials having improved thermal shock properties. In some embodiments, the joint is made of or coated with boron nitride. In some embodiments, the joint is sized and shaped to tighten when heated. In some embodiments, the liner also includes at least one alignment member for securing the casing with respect to the plasma of the plasma torch to span a predetermined distance with respect to the plasma and expose different portions of the segments to different temperature gradients of the plasma.

Another aspect of the present technology is directed to a liner for a plasma torch including a liner for a plasma torch including a disposable, elongate, non-rigid casing for use within a plasma torch for substantially surrounding a plasma of the plasma torch. The casing is formed from a flexible ceramic material that at least is transparent to microwave energy and is capable of expanding and contracting a desired amount. The liner also includes a first support configured to engage with a first end of the casing; and a second support configured to engage with a second end of the casing, wherein the first support and the second support are configured to secure the casing with respect to the plasma of the plasma torch. This aspect of the technology can include one or more of the following features. In some embodiments, the flexible ceramic material includes a ceramic ribbon. In some embodiments, the liner also includes releasable fastening devices on each of the first support and second support for releasably securing the first support and the second support to the plasma torch in a desired position with respect to the plasma and enabling the casing to be stretched between the first support and second support and span a predetermined distance with respect to the plasma when attached to the plasma torch so that different portions of the casing can be exposed to different temperature gradients of the plasma and thereby readily expand and contract to enhance thermal shock resistance, improve wear capabilities and eliminate cracking while minimizing run-to-run contamination within the plasma torch by readily replacing the disposable casing as needed.

There are numerous advantages to the present technology. For example, the segmented liners of the present technology can, in some embodiments, provide improved thermal shock resistance capabilities. That is, in certain embodiments, due to the segmented nature of the liner and the ability to tailor the material/mechanical properties of the liner along its length, the liners of the present technology achieve improve thermal shock resistance. As a result, the segmented liners of the present technology are less likely to crack or fail than conventional liners. Another advantage possessed by certain embodiments of the present technology is improved manufacturability. By providing a segmented liner, manufacturing burdens and waste is reduced. That is, it is easier and less costly to create shorter stackable ceramic segments than longer unitary liners that are prone to breaking during manufacturing, shipping, and installation. Another advantage of the present technology is the ability to replace worn or contaminated portions of the liner. In conventional systems, the entire liner would need to be replaced if a crack or unwanted coating was deposited on any portion of the liner. The present technology allows the reuse of undamaged segments of the liner by replacement of only the cracked or damaged segments.

BRIEF DESCRIPTION OF THE DRAWINGS

The invention may be more fully understood from the following detailed description taken in conjunction with the accompanying drawings.

DETAILED DESCRIPTION

Figure 1:
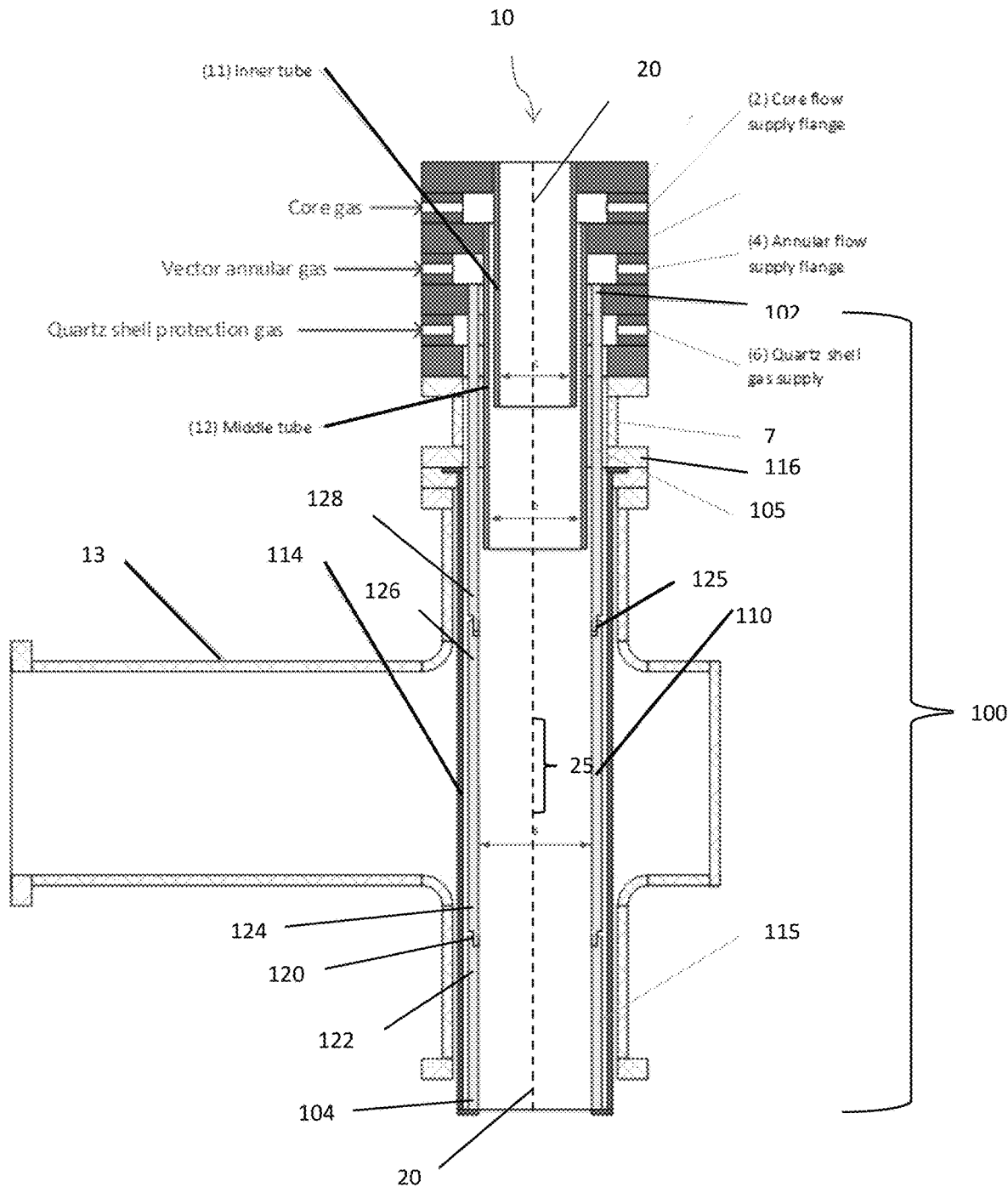
FIG. 1 is a cross sectional view of a core-annular plasma torch including a segmented ceramic liner in accordance with an embodiment of the technology.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

In general, aspects of the present technology are directed to devices, systems and methods relating to a ceramic liner for plasma torch (e.g., core-annular plasma torch, swirl plasma torch) applications. The ceramic liner is an important part of the torch and is used in the transport and delivery of materials to the plasma. That is, at least some portions of the ceramic liner are exposed to the thermal conditions of the plasma and surrounding environment. As the ceramic liner aids in the transport of materials to be processed, the material forming the ceramic liner is required to withstand the extreme temperatures and temperature gradients surrounding the plasma. In addition, the material forming the liner is typically made of high purity materials so as not to contaminate samples or reduce the material's ability to withstand high temperatures. Unfortunately, high purity ceramic materials tend to have lower than desired thermal shock resistance (e.g., ability to withstand large changes in temperature, such as those experienced adjacent to or on the boundary of a plasma). The present disclosure is directed to devices, systems and methods which provide an improved ceramic liner having improved thermal shock resistance. The present disclosure provides a segmented ceramic liner for a plasma torch. In embodiments, the segmented ceramic liner and methods of using, assembling, and maintaining the segmented liner provide many advantages over conventional unitary ceramic liners. For example, the segmented liners can be tailored (e.g., one or more of the materials of the segments, lengths of the segments, joints of the segments, and positioning of the segments) to provide enhanced thermal shock resistance and/or improved wear capabilities.

In general, the segmented ceramic liner disclosed herein can be formed of two or more segments (e.g., 2, 3, 4, 5, 6 or more segments) having a joint connecting two vertically adjacent segments together. The joint is sized to minimize plasma leakage and arcing. In most embodiments, the segmented structure is supported and surrounded by an outer tube that provides additional resistance in high density electrical fields (e.g., environments including and/or surrounding microwave plasmas). In general, both the outer tube and segmented liner are formed of ceramic materials that can withstand the temperatures associated with microwave plasma environments. In addition, both the outer tube and segmented liner are formed of materials that are transparent to microwave energy. Some exemplary materials include, but are not limited to, quartz, alumina, alumina based materials such as corundum, nitrides, such as, boron nitride, silicon nitride, and aluminum nitride (pure or with additives, e.g., boron nitride with silicon dioxide additive). The one or more joints in the segmented liner can be tailored to provide improved thermal shock capabilities to the liner. For example, the materials forming the one or more joints can be made of or coated with materials having improved thermal shock properties. In addition, or alternatively, the one or more joints may be sized/configured to provide better resistance to thermal shock. For example, by placing the joint at the location of a large thermal gradient, it is believed that the segmented liner can prevent against thermal shock based cracking better than a unitary liner. The segmented liner can be further tailored by selecting appropriate materials for each of the segments forming the liner. That is, not all of the segments need to be made from the same material. For example, in an embodiment including a three segments (i.e., top, middle, and bottom), the top segment, which can be separately cooled, can be made from quartz, whereas the middle and bottom segments can be made from alumina. To provide additional thermal shock resistance, the first and second joints can either be formed of boron nitride or contain a coating of boron nitride. One skilled in the art would appreciate that the size, shape, and materials of the various components described herein can vary depending on various factors. For example, the number or size of segments in a segmented casing can vary in different embodiments. In some embodiments, the casing can include a single structure, such as a woven or non-woven ceramic material. Additional materials that are transparent to microwave radiation can also be used in addition to or instead of ceramic materials.

FIG. 1 illustrates a cross-sectional schematic view of a core-annular plasma torch 10 that includes a segmented ceramic liner 100 in accordance with the present technology. In particular, the segmented liner 100 of FIG. 1 includes three distinct segments with two joints. The segmented ceramic liner of FIG. 1 includes a top segment 105, a middle segment 110, and a bottom segment 115, which are vertically stacked to form the segmented ceramic liner (i.e., a casing extending from a top portion 102 of the top segment 105 to a bottom portion 104 of the bottom segment 115).

Between adjacent vertically stacked segments are joints. A first joint (or a bottom joint) 120 is positioned at a location including a top portion 122 of the bottom segment 115 and a bottom portion 124 of the middle segment 110. A second joint (or a top joint) 125 is located at a top portion 126 of the middle segment 110 and a bottom portion 128 of top portion 105.

FIG. 1 shows the location of the segmented liner 100 within a body of torch 10. The core-annular torch includes three concentrically mounted ceramic tubes: an inner tube 11 having an inner diameter shown as c, a middle tube 12 having an inner diameter shown as b, and the segmented ceramic liner 100, having an inner diameter shown as a. Surrounding the segmented ceramic liner 100 is an outer tube or shell 114. The outer tube 114 is spaced from the segmented liner 100 by means of an alignment member 116, which in FIG. 1, includes a flange housing both the outer tube 114 and the top segment 105 of the segmented liner 100. In certain embodiments, such as the embodiment shown in FIG. 1, the alignment member 116 can be water cooled, as shown at location 7. Also shown in FIG. 1, is an energy applicator or waveguide 13 for directing and focusing microwave energy within the torch 10.

During operation of torch 10, core gas, vector annular gas, and a cooling protection gas are delivered to the torch 10 at ports 2, 6, and 6 respectively. Samples and/or precursors enter through the top of the device (not shown) and pass the interiors of the inner tube 11, middle tube 12 and, liner segmented liner 10, along dotted line 20. The samples/precursors are processed by a plasma typically generated in the location of the waveguide 13 or at location 25 along the dotted line 20.

Figure 2:
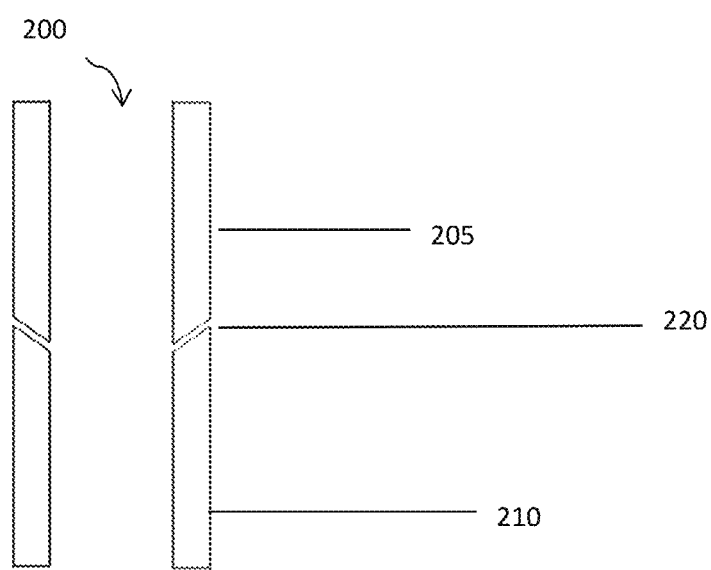
FIG. 2 is a cross-sectional view of another embodiment of a segmented ceramic liner according to the present technology.

In the embodiment shown in FIG. 1, the first and second joints 120, 125 are lap joints. That is, the top and/or bottom portions of segments 105, 110, and 115 are formed with a mating or overlapped shape to tightly rest against to form the joint. Specifically, middle segment 110 has a bottom portion 124 that is shaped to fit together with the top portion 122 of bottom segment 115. Similarly, the top portion 126 of middle segment 110 is shaped to fit together with bottom portion 128 of the top segment 105. While in FIG. 1, the shape of the joint is a lap or overlapping structure, other joint types or structures are possible. For example, FIG. 2 shows an embodiment illustrating a tapered joint between two vertically adjacent stacked segments. The joints can have any type of mating, overlapped, or tapered structure. It is desired that any gaps or spacing between portions forming the joint be minimized to reduce arcing and plasma leakage. As a result, the overlapping, mating or tapered structures should include tight tolerances to aid in the minimization of plasma leakage.

The outer tube or shell 114 can support the segmented liner 100 structure and provide additional dielectric resistance. In general, the outer tube 114 is formed of quartz or other microwave transparent material. A cooling gas can be supplied to the gap between the liner 100 and the outer tube 114.

The materials forming the top, middle, and bottom segments can be selected as desired. In general, each of the top, middle and bottom segments is formed from a ceramic that is transparent to microwave radiation. However, each segment can be formed from the same or from a different material than its neighboring adjacent segment. In addition, the portions of the segments forming the joints can be made of or coated with a different material than a remaining portion of the segment. For example, with respect to middle segment 110, the top and bottom portions 126 and 124 can include a different material than the remainder or body of middle segment 110. In particular, the middle segment can be formed of alumina, whereas the top and bottom portions 126 and 124 can include boron nitride or silicon nitride.

In addition to material changes between the top and bottom portions of the segments 105, 110 and 115 and their respective remaining portions, there can be material differences between segments. For example, the top segment 105 may be formed from quartz, whereas the middle segment 110 and bottom segment 115 can be formed from alumina. In certain embodiments the middle segment 110 is formed from alumina, whereas the bottom segment 115 is formed completely from boron nitride.

The locations of joints 120 and 125 can be designed to provide enhanced thermal shock properties for the segmented liner 100 when used in specific torches 10. For example, as shown in FIG. 1, joints 120 and 125 are positioned outside of the waveguide 13. To position the joints in the desired locations, the length of each of the segments is set with joint placement in mind. While the segments 105, 110, and 115 are not shown to proper scale, it is noted that the lengths of the top segment 105 is not equal to either the middle segment 110 or the bottom segment 115, and as a result, control over the locations of the joints 120 and 125 is provided.

The alignment member 116 can be made from any structure that can position and maintain the position of the segmented liner 100 (e.g., segmented ceramic casing) with respect to the outer tube 114. In the embodiment shown in FIG. 1, the alignment member 116 is a flange extending around the outer tube 114. In embodiments, the alignment member 116 can be built into the outer tube 114. For example, the alignment member 116 can be a lip or a ridge within a flange or a housing about the outer tube 114. A portion of the segmented liner 100 would fit within the lip or connect to the ridge to secure the alignment of the segmented liner 100 with the outer tube 114. Other structures can also be used as alignment members. These structures can be integrated into one of the outer tube 114 or one of the segments (e.g. 105, 110, 115) forming the segmented liner 100. In some embodiments, the alignment member is a separate structure that connects and maintains the positioning of the outer tube 114 with the segmented liner 10. Different types of alignment members or support structures can be used in different embodiments. For example, alignment members or support structures can be positioned on or engage with opposing ends of a segmented liner in order to secure the liner with respect to the plasma torch.

FIG. 2, shows another embodiment of a ceramic liner in accordance with the present technology. In this embodiment, the segmented liner 200 is formed of just two segments, a top segment 205 and a bottom segment 210. Joint 220 is shown as a tapered joint. This type of joint allows the adjacent segment to self-center during assembly. In addition, this configuration mitigates vertical thermal growth that can occur during operation of the plasma. While not wishing to be bound by theory, it is believed that as the lower segment 210 gets hotter, it grows radially. As it grows radially, it is believed that the lower segment 210, which is now radially extended, will allow the upper segment 205 to sink down into the taper joint 220, mitigating some of the vertical, axial growth as well tightening of the gap within the joint (i.e., reducing arcing and plasma leakage).

While the embodiments shown have included three segments or two segments, any number of segments that are practicable or desirable is within the scope of the present technology. In addition, while FIG. 1 shows the segmented liner within a core-annular plasma torch, the segmented liner of the present technology can be used in any type of microwave plasma torch. For example, it is anticipated that the segmented liner would also be useful within a swirl plasma torch. In addition, the locations of the one or more joints can be tailored for the specific torch and/or operating conditions. For example, if it is desired to keep the top segment outside of the plasma, the vertical length of the bottom and any middle segments can be tailored so as to properly position the segmented liner within the torch, with the top segment outside of the plasma. In one embodiment including three segments, the height of the middle segment is substantially equal to the height of the waveguide. For example, in an embodiment featuring a waveguide having a height of 4.875 inches, the middle segment height can also be approximately 4.875 inches (e.g., 4.7 inches to 4.95 inches). In another embodiment in which the height of the waveguide is about 2.5 inches, the height of the middle segment is also about 2.5 inches (e.g., 2.35 to 2.65 inches).

Figure 3:
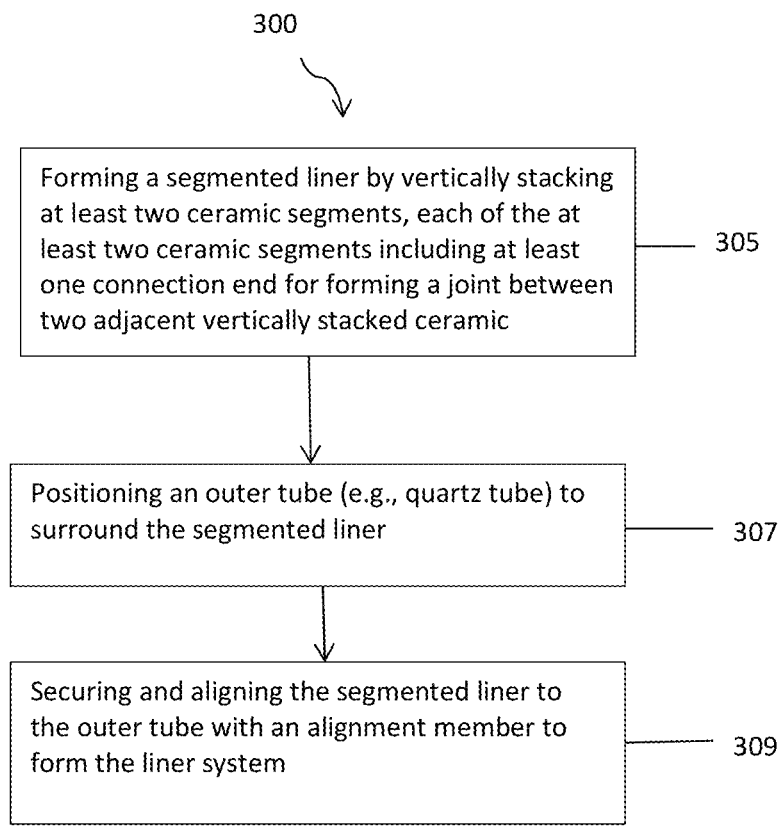
FIG. 3 is a flow chart of a method of assembling a liner system for a plasma torch in accordance with an embodiment of the present technology.
Figure 4:
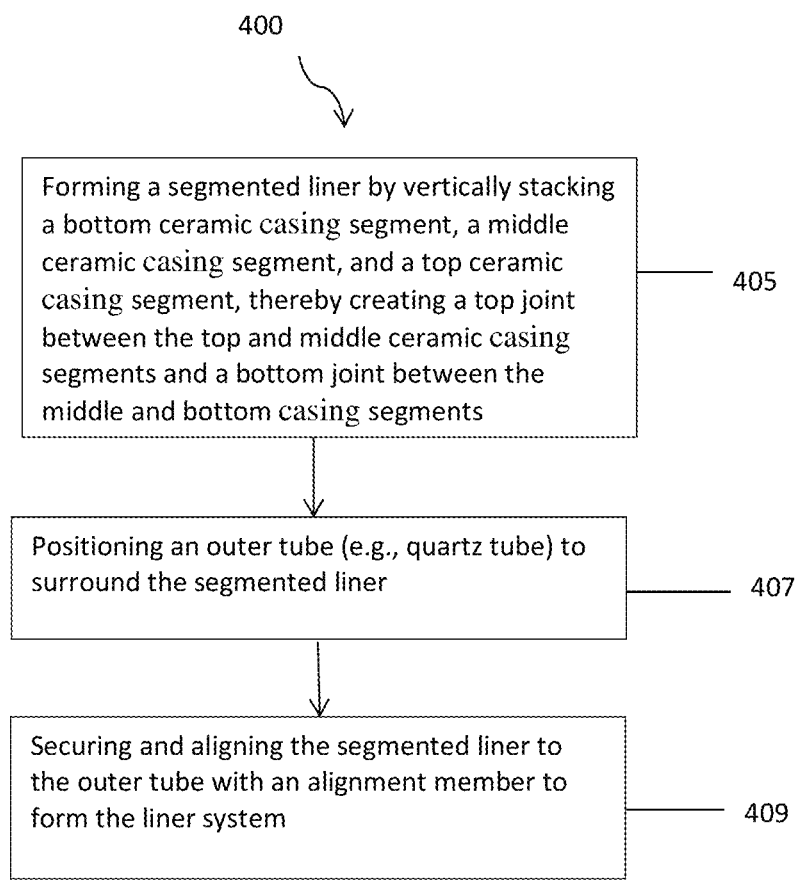
FIG. 4 is a flow chart of a method of assembling a liner system for a plasma torch in accordance with an embodiment of the present technology.

Referring to FIGS. 3 & 4, shown are two embodiments of a method for assembling a segmented liner system. FIG. 3 illustrates a method that involves stacking of at least two ceramic segments, whereas FIG. 4 relates to the stacking of top, middle, and bottom ceramic casing segments. The method 300 of FIG. 3 includes three steps. In step 305, the segmented liner is formed by vertically stacking at least two ceramic segments, each of the at least two ceramic segments including at least one connection end for forming a joint between two adjacent vertically stacked ceramic segments. In step 307, an outer tube is positioned to surround the segmented liner. Finally, in step 309 the segmented liner is secured and aligned to the outer tube with an alignment member to form the segmented liner system. Optionally, some embodiments feature an additional step of providing and flowing a cooling gas between the secured and aligned segmented liner and outer tube. This optional step typically would follow step 309, but in some embodiments may follow step 307.

The method 400 shown in FIG. 4 illustrates a method of assembly of a segmented liner system including a top, middle, and bottom ceramic casing segments. Step 405 includes: forming a segmented liner by vertically stacking a bottom ceramic casing segment, a middle ceramic casing segment, and a top ceramic casing segment, thereby creating a top joint between the top and middle ceramic casing segments and a bottom joint between the middle and bottom casing segments. Step 407 includes: positioning an outer tube to surround the segmented liner, the outer tube being transparent to microwave energy (e.g., a quartz outer tube). And step 409 includes: securing and aligning the segmented liner to the outer tube with an alignment member, wherein each of the top, middle, and bottom ceramic casing segments are formed of ceramic material transparent to microwave energy.

Figure 5:
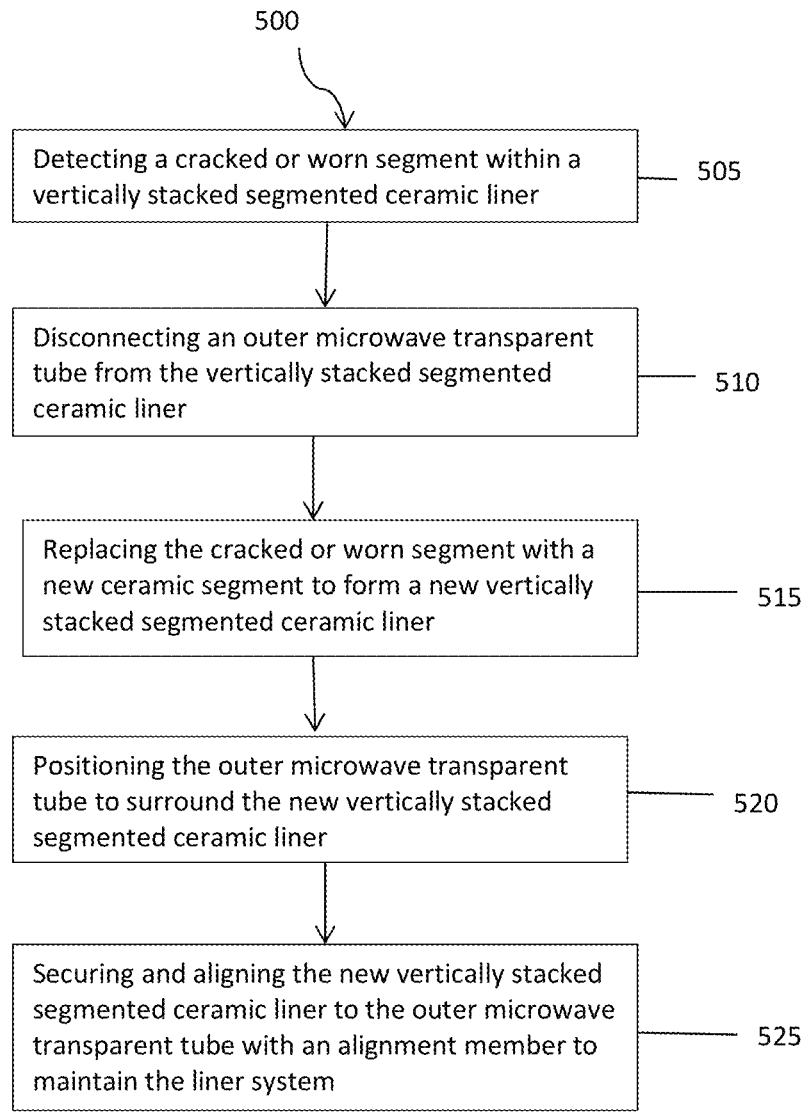
FIG. 5 is a flow chart of a method of maintaining a liner system for a plasma torch in accordance with an embodiment of the present technology.

The segmented liner system assembly of the present technology provides many advantages including the advantage of extended life of the ceramic liner through maintenance and/or ability to tailor or change portions of the segmented ceramic liner through interchangeable parts. FIG. 5 shows a method of maintaining a liner system in accordance with these general principles. In the flow chart illustrated in FIG. 5, method 500 includes five steps. In step 505, a cracked or a worn segment within a vertically stacked segmented ceramic liner is detected or identified. Next in step 510, an outer microwave transparent tube from the vertically stacked segmented ceramic liner is disconnected. In step 515, the worn segment (or cracked segment) is replaced with a new ceramic segment to form a new vertically stacked segmented ceramic liner. In step 520, the outer microwave transparent tube is positioned to surround the new vertically stacked segmented ceramic liner. And finally in step 525, the new vertically stacked segmented ceramic liner is secured and aligned to the outer microwave transparent tube with an alignment member.

While method 500 has been described as a method of maintaining, it is noted that this method can also be used or adapted by those in the art as a method of tailoring the ceramic liner for a particular set of torch operating conditions. In particular, instead of detecting a crack or worn segment, a new placement of a joint (e.g., new joint location within a torch body) or a new material choice for at least a portion of a segment is identified based upon desired operating conditions. Then instead of replacing the worn segment, a segment is replaced to provide either a new joint location and/or a new material within the replaced segment in accord with the identification step. In some embodiments, if the casing is a disposable or replaceable casing, maintaining the liner system can include identifying a crack or worn portion of the replaceable casing and removing the casing from one or more support structures that secure the casing with respect to the plasma torch. Once the damaged or worn casing has been removed, a new casing can be attached to the support structures and secured with respect to the plasma torch. In some embodiments, a replaceable casing can be replaced even if it is not worn in order to, for example, minimize run-to-run contamination.

Figure 6:
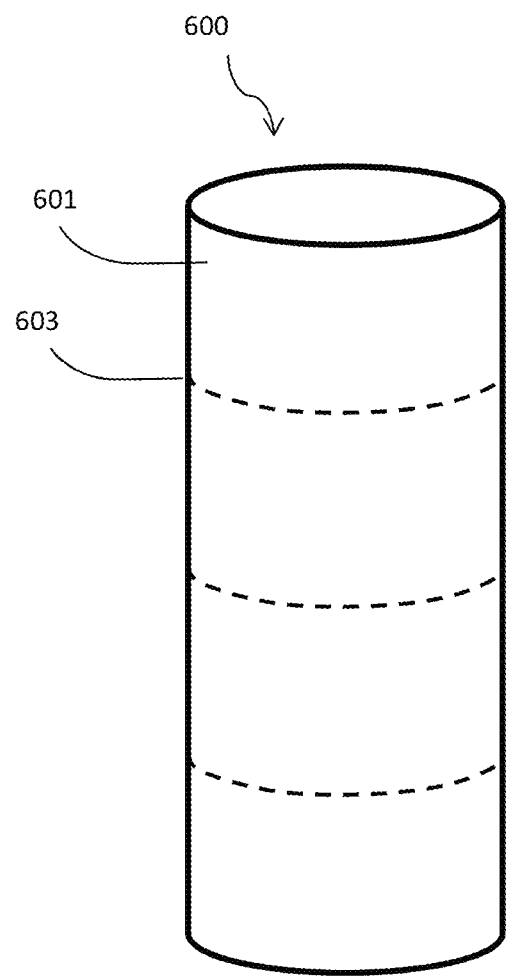
FIG. 6 illustrates a segmented ceramic liner with axial segmentation, in accordance with an embodiment of the present technology.

FIG. 6 illustrates a segmented ceramic liner 600 with axial segmentation, in accordance with an embodiment of the present technology. In this embodiment, the segmented ceramic liner 600 includes a number of liner segments 601 which are segmented axially, and a joint 603 is located between each of the liner segments 601 to mitigate stress due to thermal expansion in the axial direction.

Figure 7:
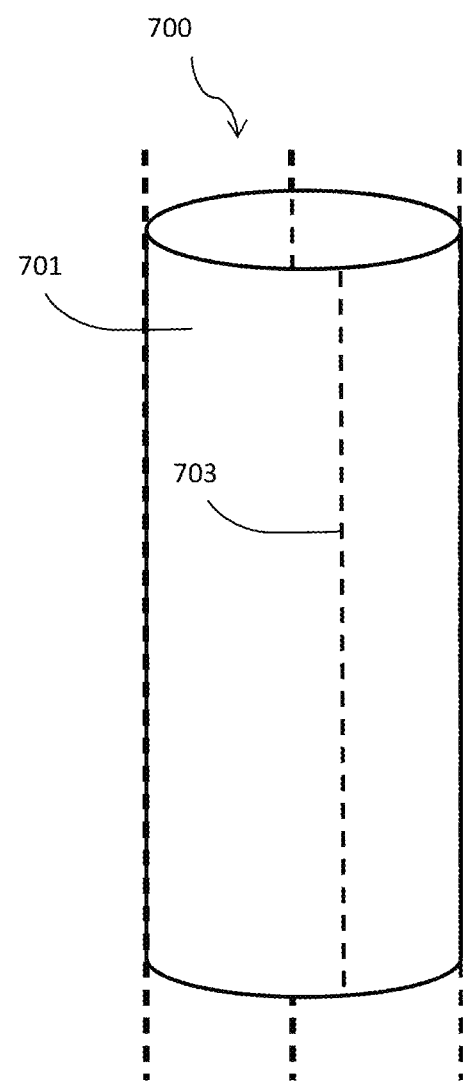
FIG. 7 illustrates a segmented ceramic liner with circumferential segmentation, in accordance with an embodiment of the present technology.

FIG. 7 illustrates a segmented ceramic liner 700 with circumferential segmentation, in accordance with an embodiment of the present technology. In this embodiment, the segmented liner 700 includes a number of liner segments 701 which are segmented across joints 703 illustrated. Such an arrangement can alleviate hoop stress due to thermal expansion along the circumference of the cylindrical liner 700. In one embodiment, the four joints 703 divide the cylindrical liner 700 into four equally sized liner segments 701.

Figure 8:
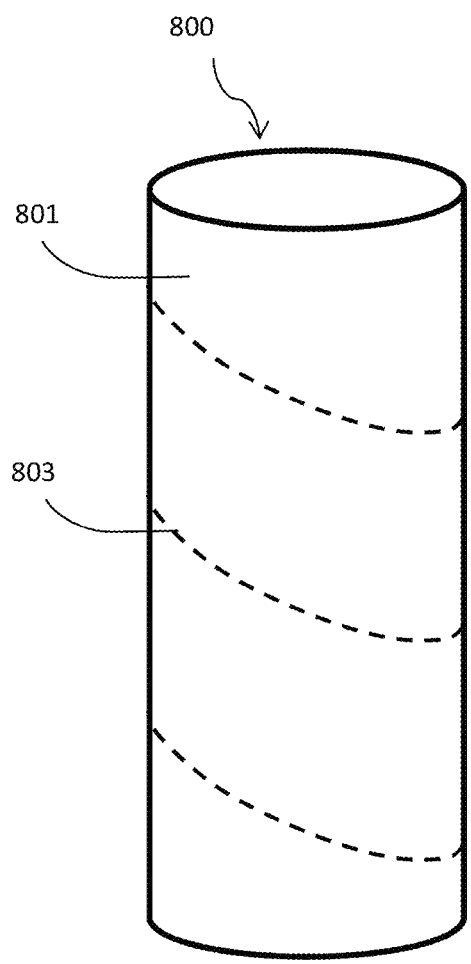
FIG. 8 illustrates a segmented ceramic liner with diagonal segmentation, in accordance with an embodiment of the present technology.

FIG. 8 illustrates a segmented ceramic liner 800 with diagonal segmentation, in accordance with an embodiment of the present technology. In this embodiment, the segmented liner 800 includes a number of liner segments 801 which are segmented across diagonal joints 803. Such an arrangement can alleviate stress along an axis or direction other than the axial direction discussed above in reference to FIG. 6 or along the circumference, as discussed in reference to FIG. 7.

In an alternative embodiment, the ceramic liner 800 can include a flexible ceramic material, such as a ceramic ribbon that is coiled or wrapped in a helix shape with a single joint 803 spiraling around the ceramic liner. In such an embodiment, one or more alignment members can be used, either surrounding the ceramic liner 800 or on opposing ends of the ceramic liner 800, in order to secure the ceramic liner 800 in place.

Figure 9:
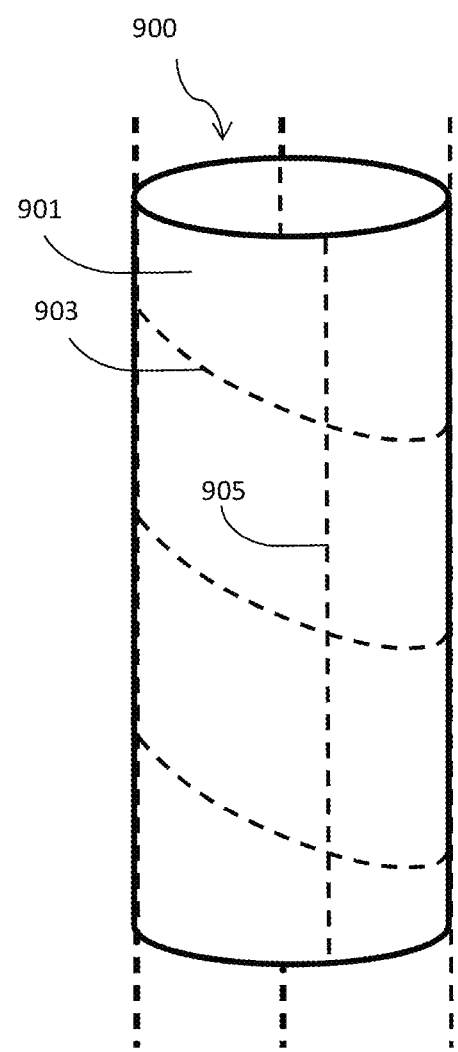
FIG. 9 illustrates a segmented ceramic liner with multi-axis segmentation, in accordance with an embodiment of the present technology.

FIG. 9 illustrates a segmented ceramic liner 900 with multi-axis segmentation, in accordance with an embodiment of the present technology. In this embodiment, the segmented liner 900 can include a number of segments 901 separated by diagonal joints 903 and lengthwise joints 905 in order to minimize stress due to thermal expansion across multiple axes simultaneously.

Figure 10:
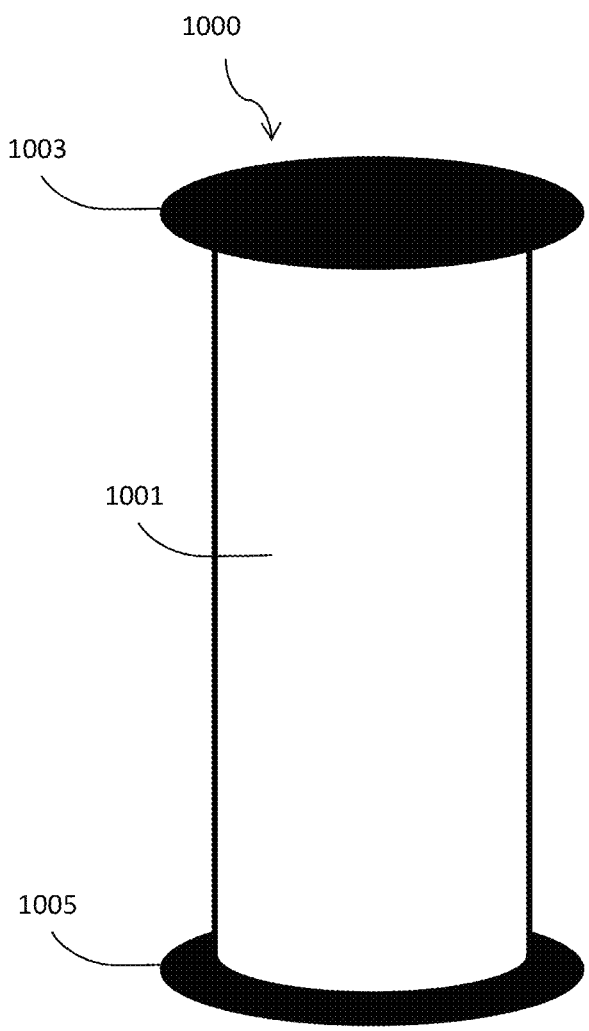
FIG. 10 illustrates a disposable or replaceable ceramic liner formed of a ceramic material, in accordance with an embodiment of the present technology.

FIG. 10 illustrates a disposable or replaceable ceramic liner 1000 formed of a ceramic material, in accordance with an embodiment of the present technology. To minimize stress due to thermal expansion, as well as minimize run-to-run contamination, a disposable or replaceable liner may be created from a ceramic material 1001, such as a woven or a non-woven fabric. In some embodiments, the ceramic material can be a flexible ceramic material. In this embodiment, the ceramic material 1001 may be stretched or supported using a first support 1003 and a second support 1005. In one embodiment, the first support 1003 can engage with a first end of the ceramic material 1001, while the second support 1005 can engage with a second end of the ceramic material 1001. The first support 1003 and the second support 1005 can include support brackets, and the ends of the ceramic liner 100 can be attached or disengaged from the brackets in order to replace the ceramic liner 100. In some embodiments, releasable fastening devices can be included on the supports for releasably securing the supports to the plasma torch and to position the ceramic liner 100 in a desired position with respect to the plasma. In some embodiments, the supports can be designed to rest on or engage with a portion of the plasma torch without specific fastening devices.

One of ordinary skill in the art will appreciate further features, advantages, and adaptations of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A liner for a plasma torch, comprising:
 a segmented casing for use within the plasma torch, the casing having at least two segments formed from materials that are transparent to microwave energy;
 wherein each segment comprises an overlapping joint composed of overlapping joint portions of adjacent segments, wherein the overlapping joint portions are formed in the segment such that the top edge portion and/or the bottom edge portion of adjacent segments are shaped to fit together;
 wherein each overlapping joint comprises a gap between the joint portions such that the segments can expand and contract with respect to each other while minimizing plasma leakage and arcing between the segments, wherein the gap is positioned between the joint portions to allow thermal expansion of the overlapping joint along an axial direction.

2. The liner as defined in claim 1, wherein the overlapping joint portions are made of the same material as the segment to which the overlapping joint is attached.

3. The liner as defined in claim 1, wherein the overlapping joint portions are made of or coated with boron nitride.

4. The liner as defined in claim 1, wherein the overlapping joint portions are sized and shaped to tighten when heated.

5. The liner as defined in claim 1, wherein the segmented casing comprises a bottom casing segment, a middle casing segment, and a top casing segment with a first overlapping joint disposed between the bottom casing segment and the middle casing segment and a second overlapping joint disposed between the middle casing segment and the top casing segment.

6. The liner as defined in claim 1, wherein the overlapping joint is a lap joint.

7. The liner as defined in claim 1, wherein the overlapping joint is a tapered joint.

8. The liner as defined in claim 1, wherein the overlapping joint extends circumferentially around the segment.

9. The liner as defined in claim 1, wherein the overlapping joint extends circumferentially and diagonally around the segment.

* * * * *